(12) United States Patent
Sugizaki et al.

(10) Patent No.: US 6,778,748 B2
(45) Date of Patent: Aug. 17, 2004

(54) OPTICAL FIBER, DISPERSION COMPENSATOR USING THE SAME, AND OPTICAL TRANSMISSION SYSTEM

(75) Inventors: Ryuichi Sugizaki, Tokyo (JP); Takeshi Yagi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/012,319

(22) Filed: Dec. 12, 2001

(65) Prior Publication Data

US 2002/0126973 A1 Sep. 12, 2002

(30) Foreign Application Priority Data

Dec. 22, 2000 (JP) .......................................... 2000-390899
Oct. 29, 2001 (JP) .......................................... 2001-331128

(51) Int. Cl.[7] .............................. G02B 6/16; G02B 6/22
(52) U.S. Cl. ........................................ 385/123; 385/127
(58) Field of Search ................................ 385/123, 124, 385/126, 127; 359/334, 337.5

(56) References Cited

U.S. PATENT DOCUMENTS

| | | | |
|---|---|---|---|
| 5,361,319 A | | 11/1994 | Antos et al. |
| 5,448,674 A | * | 9/1995 | Vengsarkar et al. ........ 385/123 |
| 5,838,867 A | | 11/1998 | Onishi et al. |
| 5,887,093 A | | 3/1999 | Hansen et al. |
| 6,490,397 B2 | * | 12/2002 | Kato et al. .................. 385/123 |
| 6,701,052 B2 | * | 3/2004 | Berkey et al. .............. 385/126 |
| 2002/0067903 A1 | * | 6/2002 | Fleury et al. ................ 385/123 |

FOREIGN PATENT DOCUMENTS

| | | |
|---|---|---|
| EP | 0 674 193 | 9/1995 |
| EP | 0 914 015 | 5/1999 |
| EP | 0 935 146 | 8/1999 |
| WO | WO 99/66607 | 12/1999 |

OTHER PUBLICATIONS

M. Hirano et al. Dispersion compensating fiber over 140 nm–bandwidth. 27th European Conference on Optical Communication (ECOC '01), vol. 4, pp. 494–495. Oct. 2001.*

* cited by examiner

*Primary Examiner*—Akm Enayet Ullah
*Assistant Examiner*—Michael J. Stahl
(74) *Attorney, Agent, or Firm*—Oblon, Spivak, McClelland, Maier & Neustadt, P.C.

(57) ABSTRACT

The present invention provides an optical fiber having a compensation function of the dispersion characteristic of an optical transmission line in S-band, and preferably has a filter function for cutting off wavelengths exceeding S-band. The optical fiber of the present invention has three-layered glass layers having different compositions between neighboring layers. When the maximum relative refractive index difference of a first glass layer (1) formed at the innermost of the optical fiber to a third glass layer (3) (standard layer) is represented by $\Delta 1$, and the minimum relative refractive index difference of a second glass layer (2) as a second layer from the innermost of the optical fiber to the standard layer is by $\Delta 2$, the following inequalities are satisfied: $1.0\% \leq \Delta 1 \leq 3.0\%$, and $-1.0\% \leq \Delta 2 \leq -0.4\%$. The dispersion value at the set wavelength of the S-band is set to $-8$ ps/nm/km. For example, the value achieved by dividing the dispersion by the dispersion slope is equal to a positive value less than 300, and the transmission loss at the wavelength of 1520 nm is set to be larger than the transmission loss at the wavelength of 1500 nm by 1 dB or more.

14 Claims, 5 Drawing Sheets

OPTICAL FIBER, DISPERSION COMPENSATOR USING THE SAME, AND OPTICAL TRANSMISSION SYSTEM

BACKGROUND OF THE INVENTION

1. Field of the Invention

The present invention relates to an optical fiber suitably used for wavelength division multiplexing (WDM) transmission in the wavelength range from 1420 nm to 1520 nm, a dispersion compensator using the optical fiber and an optical transmission system.

2. Description of the Related Art

Developments of the information society have increasingly promoted increase of a communication information amount, and such an increase of the communication information amount makes causes wavelength division multiplexing transmission to be widely used in the communications field. The wavelength division multiplexing transmission is a system for transmitting light having plural wavelengths with one optical fiber.

Recently, an optical amplifier using an erbium-doped optical fiber (EDFA) has been developed as an optical amplifier applicable to a relay portion of the wavelength division multiplexing transmission. At present, installation of EDFA at a relay portion of the wavelength division multiplexing transmission makes it unnecessary to convert optical signals to electrical signals every wavelength at the relay portion, and this merit is promoting the developments of the wavelength division multiplexing transmission.

The optical amplification band of EDFA is in the wavelength range from 1520 nm to 1565 nm (called as "C-band"), or in the wavelength range from 1565 nm to 1620 nm (called as "L-band"). At present, studies on the wavelength division multiplexing transmission using the above wavelength bands are actively performed.

Furthermore, in order to support a further increase of the communication information amount, it has been recently considered to carry out the wavelength division multiplexing transmission in the wavelength range from 1420 nm to 1520 nm (called as "S-band"). The wavelength division multiplexing transmission in the S-band is carried out by applying TDFA (Thulium-Doped Fiber Amplifier) or Raman fiber amplifier.

SUMMARY OF THE INVENTION

The present invention has an object to provide an optical fiber having the following construction, a dispersion compensator using the optical fiber, and an optical transmission system.

The optical fiber according to the present invention is characterized in that the chromatic dispersion at a set wavelength in the wavelength range of or more 1420 nm but less than 1520 nm is set to −8 ps/nm/km or less.

BRIEF DESCRIPTION OF THE DRAWINGS

Exemplary embodiments of the invention will now be described in conjunction with drawings, in which.

DETAILED DESCRIPTION OF THE PREFERRED EMBODIMENTS

Single-mode optical fibers having zero dispersion in a wavelength band around 1.3 μm in wavelength (hereinafter merely referred to as "single-mode optical fibers") are laid as transmission networks for optical communications over the world. The single-mode optical fiber has a positive dispersion value (about 8 to 15 ps/nm/km) as shown in a characteristic line a of FIG. 7.

Figure 7:
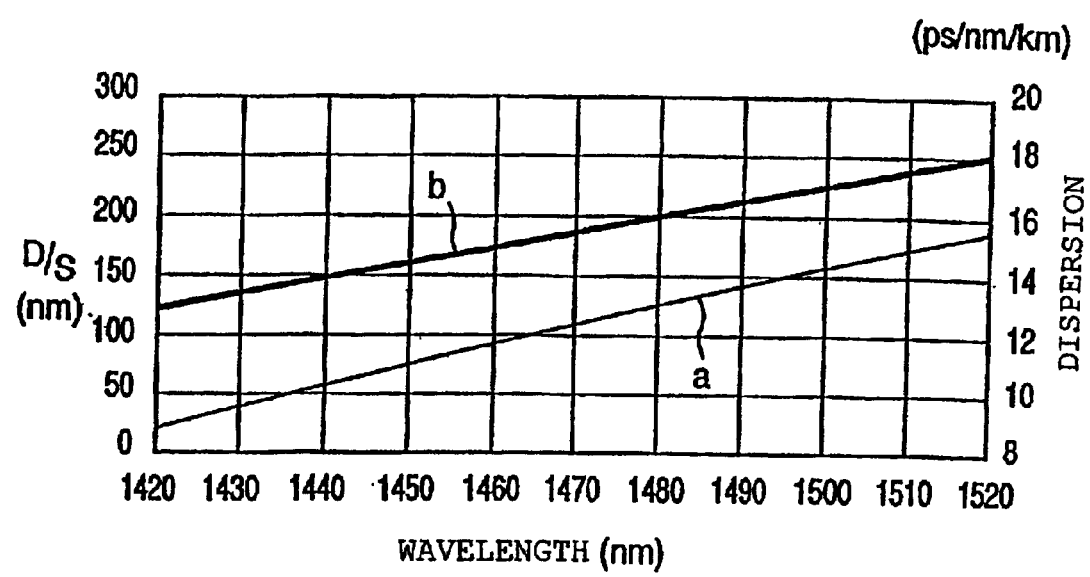
FIG. 7 is a graph showing the chromatic dispersion and (dispersion/dispersion slope) characteristic in S-band of a single-mode optical fiber.

A characteristic line b of FIG. 7 shows a value D/S achieved by dividing the dispersion value in the S-band of a single-mode optical fiber by a dispersion slope. As is apparent from the characteristic line b, the single-mode optical fiber has a large positive dispersion slope (about 0.060 to 0.075 ps/nm$^2$/km).

Therefore, when the wavelength division multiplexing transmission in the S-band is carried out by using a single-mode optical fiber as an optical transmission line, the dispersion characteristic of the single-mode optical fiber must be compensated. However, neither a dispersion compensating optical fiber nor a dispersion compensator has not been proposed for the wavelength division multiplexing transmission in the S-band.

That is, the conventional dispersion compensating optical fibers proposed to perform dispersion compensation for single-mode optical fibers in the C-band and the L-band can hardly compensate the dispersion characteristic of the single-mode optical fibers in a broad band of the S-band. However, the dispersion compensating optical fibers proposed for the dispersion compensation in the C-band and the L-band have not been directly applicable for the dispersion compensation in the S-band.

Furthermore, when S-band signals are amplified by using the Raman fiber amplifier, the wavelength of pumping light for the Raman fiber amplifier is set to about 1390 nm in wavelength. However, the dispersion compensating optical fibers proposed for the dispersion compensation in the C-band and the L-band have large transmission loss at the wavelength of about 1390 nm because OH-groups thereof affect absorption peaks. Therefore, the dispersion compensating optical fibers proposed for the dispersion compensation for the C-band and the L-band cannot perform the Raman amplification efficiently.

Further, there is a case where a dispersion compensating optical fiber is applied as a part of a concentrated in-line Raman repeaters. In this case, if isolation performance of a band-pass filter of the relay apparatus is low, undesired signals of the C-band and the L-band occurring from the relay apparatus cannot be cut off, and these signals are unintentionally transmitted as noises to the subsequent stages. Accordingly, the dispersion compensating optical fiber of the single-mode optical fiber in the S-band is required to have a filtering function for cutting off the signals of the C-band and the L-band.

With respect to optical fibers used for the dispersion compensation of single-mode optical fibers in the S-band, the cutoff wavelength may be set to 1460 nm or less. However, when this optical fiber is used as an optical fiber for a Raman fiber amplifier, the cutoff wavelength must be set to 1360 nm or less.

According to an aspect of the present invention, there is provided an optical fiber and a dispersion compensator with which the dispersion characteristic of an optical transmission line to a single-mode optical fiber or the like can be compensated when wavelength division multiplexing transmission is carried out in S-band. It is preferable that the optical fiber and the dispersion compensator can perform the wavelength division multiplexing transmission with high efficiency and high quality by using a Raman fiber amplifier. An optical transmission system using the optical fiber and the dispersion compensator as described above can perform high-quality wavelength division multiplexing transmission for which the chromatic dispersion is compensated.

Next, preferred embodiments according to the present invention will be described with reference to the accompanying drawings.

Figure 1:
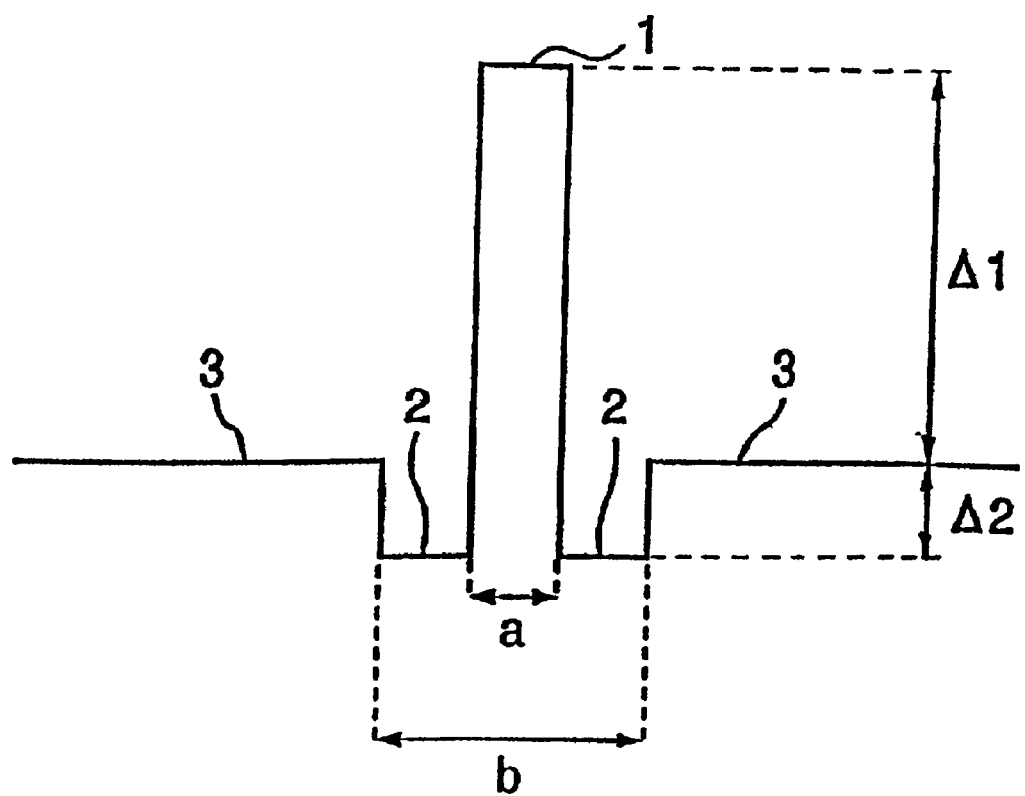
FIG. 1 is a diagram showing a refractive index profile according to a first embodiment of an optical fiber of the present invention.

FIG. 1 shows a refractive index profile of a first embodiment of an optical fiber according to the present invention. Refractive index profiles having various forms may be applied as the profile of a refractive index distribution of the optical fiber according to the present invention. However, the first embodiment uses a so-called W-shaped refractive index profile as shown in FIG. 1 which is relatively simple in structure and easy to be designed in refractive index structure and to be controlled.

The optical fiber according to the first embodiment has multi-layered (three layers in this embodiment) glass layers (first glass layer 1, second glass layer 2, third glass layer 3) having different compositions between the neighboring layers. A standard layer serving as a standard for the refractive index distribution in these three glass layers 1 is the third glass layer 3. The first glass layer and the second glass layer 2 are formed inside the third glass layer 3. In other words, the optical fiber of the first embodiment is formed such that the outer peripheral portion of the first glass layer 1 is covered by the second glass layer 2, and the outer peripheral portion of the second glass layer 2 is covered by the third glass layer 3.

In the first embodiment, representing the maximum relative refractive index difference of the first glass layer 1 (formed at the innermost of the optical fiber) to the standard layer (third glass layer 3) by $\Delta 1$, the following inequality is satisfied: $1.0\% \leq \Delta 1 \leq 3.0\%$. Further, representing the minimum relative refractive index difference of the second glass layer 2 (the second layer from the innermost of the optical fiber) to the standard layer by $\Delta 2$, the following inequality is satisfied: $-1.0\% \leq \Delta 2 \leq -0.4\%$.

In this specification, the respective relative refractive index differences $\Delta 1$ and $\Delta 2$ are defined from the following equations (1) and (2). Here, $n_1$ represents the refractive index of the refractive index maximum portion of the first glass layer 1, $n_2$ represents the refractive index of the refractive index minimum portion of the second glass layer 2 and $n_s$ represents the refractive index of the standard layer.

$$\Delta 1 = \{(n_1 - n_s)/n_1\} \times 100 \qquad (1)$$

$$\Delta 2 = \{(n_2 - n_s)/n_2\} \times 100 \qquad (2)$$

Further, the diameter a of the first glass layer 1 is set to a value in the range from 1.7 μm to 5.0 μm. The ration a/b of the diameter a of the first glass layer 1 and the diameter b of the second glass layer 2 is set so that the following inequality is satisfied: $0.3 \leq a/b \leq 0.6$. Here, the diameter means the outer diameter unless otherwise specified in this specification.

The first embodiment has the above refractive index profile, and thus it has the following characteristic. That is, in the optical fiber of the first embodiment, the chromatic dispersion at the set wavelength of the S-band is set to −8 ps/nm/km or less. Further, both the chromatic dispersion and the dispersion slope in a wavelength band of 20 nm or more which is set within the S-band are set to negative values, and the value achieved by dividing the chromatic dispersion by the dispersion slope in the above wavelength band is set to a positive value less than 300.

Further, in the optical fiber of the first embodiment, the transmission loss at the wavelength of 1390 nm is set to 3 dB/km or less. In addition, the transmission loss at the wavelength of 1520 nm is set to 1 dB or more. In a preferable optical fiber according to the first embodiment, the transmission loss at the wavelength of 1520 nm is set to a value larger than that at the wavelength of 1500 nm by 1 dB or more.

In order determine the refractive index profile of the first embodiment, the inventor of this application has made various fabrications of the optical fiber having the W-shaped refractive index profile as shown in FIG. 1, and examined the characteristics thereof. As a result of the examination, it has been found that the cutoff wavelength was equal to 800 nm or less in all the fabrications.

The above optical fibers (fabrications) are optical fibers of A to N shown in table 1, and the optical fibers of B, C, H, J, M of these optical fibers A to N are the optical fibers of the first embodiment.

TABLE 1

|   | $\Delta 1$ % | $\Delta 2$ % | a μm | a/b | loss @ 1390 nm dB/km | loss @ 1500 nm dB/km | loss @ 1520 nm dB/km | D @ 1500 nm ps/nm/km | S @ 1500 nm ps/nm²/km | D/S @ 1500 nm nm |
|---|---|---|---|---|---|---|---|---|---|---|
| A | 0.9 | −0.5 | 5.4 | 0.60 | 0.88 | 0.43 | 1.53 | −20.8 | −0.062 | 335 |
| B | 1.0 | −0.5 | 5.0 | 0.60 | 0.92 | 0.48 | 1.22 | −44.2 | −0.173 | 255 |
| C | 3.0 | −1.0 | 1.7 | 0.40 | 2.65 | 0.79 | 2.22 | −105.6 | −0.435 | 243 |
| D | 3.0 | −1.0 | 1.7 | 0.40 | 3.20 | 0.73 | 2.32 | −103.8 | −0.431 | 241 |
| E | 3.1 | −1.0 | 1.7 | 0.40 | 2.85 | 0.79 | 1.88 | −95.4 | −0.309 | 309 |
| F | 3.0 | −1.1 | 1.9 | 0.40 | 2.67 | 0.73 | 0.81 | −108.3 | −0.542 | 200 |
| G | 1.0 | −0.3 | 4.7 | 0.30 | 0.99 | 0.49 | 2.10 | −8.8 | −0.012 | 720 |
| H | 1.0 | −0.4 | 4.7 | 0.30 | 1.03 | 0.62 | 4.35 | −8.3 | −0.051 | 162 |
| I | 3.0 | −1.0 | 1.6 | 0.40 | 2.71 | * | * | * | * | * |

TABLE 1-continued

|   | Δ1 % | Δ2 % | a μm | a/b | loss @ 1390 nm dB/km | loss @ 1500 nm dB/km | loss @ 1520 nm dB/km | D @ 1500 nm ps/nm/km | S @ 1500 nm ps/nm²/km | D/S @ 1500 nm nm |
|---|---|---|---|---|---|---|---|---|---|---|
| J | 1.0 | −0.5 | 5.0 | 0.60 | 0.99 | 0.42 | 1.05 | −39.4 | −0.138 | 285 |
| K | 1.0 | −0.5 | 5.1 | 0.60 | 1.03 | 0.41 | 0.87 | −35.1 | −0.111 | 317 |
| L | 2.0 | −0.7 | 3.2 | 0.29 | 1.62 | 0.52 | * | * | * | * |
| M | 2.0 | −0.7 | 3.2 | 0.30 | 1.54 | 0.51 | 2.48 | −94.8 | −3.532 | 27 |
| N | 1.0 | −0.5 | 5.0 | 0.61 | 0.88 | 0.47 | 0.92 | −37.8 | −0.112 | 338 |

In the table 1 and the subsequent tables, loss@1390 nm represents the transmission loss value at the wavelength of 1390 nm, loss@1500 nm represents the transmission loss value at the wavelength of 1500 nm, and loss@1520 nm represents the transmission loss value at the wavelength of 1520 nm. In each table, D@1500 nm represents the dispersion value at the wavelength of 1500 nm, S@1500 nm represents the dispersion slope at the wavelength of 1500 nm, and D/S@1500 nm represents the value achieved by dividing the dispersion value by the dispersion slope at the wavelength of 1500 nm. In the tables, * represents "unmeasurable".

Here, if the relative refractive index difference Δ1 is set to 0.9% or less, the dispersion at the wavelength of 1500 nm can be reduced to −8 ps/nm/km or less, however, a bend edge appears at the wavelength of 1500 nm, so that the transmission loss may be increased. The bend edge means the boundary at which the base mode does not propagate at the long wavelength side. If the relative refractive index difference Δ1 is set to 0.9% or less and the bend edge is prevented from appearing at the wavelength of 1500 nm like the fabrication A, it is difficult to satisfy O<D/S<300.

Conversely, if the relative refractive index differenceΔ1 is excessively increased to 3.1 or more, the dispersion is increased. In this case, it is difficult to satisfy 0<D/S<300.

Therefore, in this embodiment, the range of the relative refractive index difference Δ1 is set to satisfy 1.0%≦Δ≦3.0%.

In the optical fiber having the construction shown in FIG. 1, as the relative refractive index difference Δ1 increases, the transmission loss at the wavelength of 1390 nm is more likely to be large. That is, an optical fiber having a relative refractive index differenceΔ1 of 3.0% or more is liable to have a large transmission loss at the wavelength of 1390 nm.

Therefore, if the relative refractive index difference Δ1 is set to be smaller than the relative refractive index difference Δ (for example, about 1.7 to 3.0%) of the optical fiber proposed for the dispersion compensation of the single-mode optical fiber in the C-band, the loss at the wavelength of 1390 nm can be more easily reduced. As described above, an example in which the relative refractive index difference Δ1 is reduced corresponds to the fabrication B. However, even if the relative refractive index difference Δ1 is increased to 3% for example, the increase of the loss at the wavelength of 1390 nm can be suppressed by the following technique. The technique contains adjustments for the conditions of flame polishing, the etching of the glass surface, etc.

If the relative refractive index difference Δ2 is excessively large (for example, Δ2 is set to ×0.3% like the fabrication G), it is difficult to satisfy 0<D/S<300 because it is difficult to increase the dispersion slope. On the other hand, if the relative refractive index difference Δ2 is excessively small (for example, Δ2 is set to −1.1% or less), the transmission loss at the wavelength of 1520 nm cannot be increased to 1 dB or more.

Therefore, in the first embodiment, the range of the relative refractive index difference Δ2 is set to −1.0%≦Δ2≦−0.4%.

Further, when the diameter a of the first glass layer 1 is excessively reduced to 1.6 μm or less as in the case of a fabrication I, the bend edge is shifted to a short wavelength side and finally reaches the wavelength of 1500 nm. Conversely, when the diameter a of the first glass layer 1 is excessively increased to 5.1 μm or more as in the case of a fabrication K, it is hard to increase the dispersion slope and thus it is difficult to satisfy 0<D/S<300.

Therefore, in the first embodiment, the diameter a of the first glass layer 1 is set to a value in the range from 1.7 μm to 5.0 μm.

Furthermore, when the value achieved by dividing the diameter a of the first glass layer 1 by the diameter b of the second glass layer 2 (a/b) is reduced to 0.29 as in the case of a fabrication L, it is easy to increase the dispersion slope and thus it is easy to satisfy 0<D/S<300. However, the bend edge appears at the wavelength of 1500 nm. On the other hand, when the value achieved by dividing the diameter a of the first glass layer 1 by the diameter b of the second glass layer 2 (a/b) is increased to 0.61 as in the case of a fabrication N, the bend edge does not appear at the wavelength of 1500 nm, however, it is difficult to satisfy 0<D/S<300.

Therefore, in the first embodiment, the value (a/b) achieved by dividing the diameter a of the first glass layer 1 by the diameter b of the second glass layer 2 is set to a value in the range from 0.3 to 0.6.

When the bend edge is set to appear at the wavelength of 1520 nm by adjusting the design of the core diameter, the transmission loss at the wavelength of 1520 nm can be increased to 1 dB or more.

Further, it is preferable for the optical fiber of the first embodiment that the transmission loss at the wavelength of 1520 nm is larger than that transmission loss at the wavelength of 1500 nm by 1 dB or more. Fabrications C H, M are preferable optical fibers satisfying this condition.

The optical fiber of the first embodiment has a dispersion value that is not more than −8 ps/nm/km at the wavelength of 1500 nm corresponding to a wavelength in the wavelength range (S-band) from not less than 1420 nm to less than 1520 nm. Further, the optical fiber of the first embodiment is designed such that the value (D/S) achieved by dividing the dispersion value by the dispersion slope is set to a positive value less than about 300. Accordingly, the optical fiber of the first embodiment can collectively compensate the dispersion characteristic of the single-mode optical fiber in the S-band.

That is, as described above, the single-mode optical fiber generally has the chromatic dispersion of about 8 to 15 ps/nm/km in the S-band. Accordingly, an optical fiber which is designed to compensate the dispersion value of an optical transmission line, for example, formed by a single-mode optical fiber of 40 Km in length at the wavelength of 1500 nm is required to compensate the dispersion of about 560 ps/nm.

For example, the optical fiber of the fabrication C having the maximum dispersion absolute value among the optical fibers of all the fabrications of the first embodiment can compensate the dispersion of about 560 ps/nm by setting the length thereof to about 5 km.

When the wavelength division multiplexing transmission in the S-band is carried out by using a single-mode optical fiber as an optical transmission line, an optical fiber for collectively compensating the dispersion characteristics (the dispersion and the dispersion slope) of the single-mode optical fiber is merely required to have a D/S value near to that of the single-mode optical fiber. Preferably, the D/S values of the single-mode optical fiber and the optical fiber for the dispersion compensation are substantially equal to each other.

D/S (dispersion value/dispersion slope) in the S-band of the single-mode optical fiber is equal to about 120 to 250 nm. The chromatic dispersion and dispersion slope of the single-mode optical fiber have positive values.

In the optical fiber of the first embodiment, the chromatic dispersion in the wavelength band of 20 nm or more which is set within the S-band is set to a negative value, and the value (D/S) achieved by dividing the chromatic dispersion in the above wavelength band by the dispersion slope is set to a positive value less than 300. Accordingly, the chromatic dispersion and dispersion slope of the single-mode optical fiber in the S-band can be collectively and efficiently compensated.

In the first embodiment, an optical fiber in which the transmission loss at the wavelength of 1520 nm is larger than that at the wavelength of 1500 nm by 1 dB or more can keep the minimum isolation which can cut off the wavelengths in the C-band and the L-band. That is, this optical fiber has a loss difference of 0.2 dB/km per unit wavelength, and it can exhibit the filtering function of cutting off the wavelengths in the C-band and the L-band by keeping the isolation.

For example, the optical fiber of the fabrication C has the transmission loss of about 0.8 dB/km at the wavelength of 1500 nm, and also the transmission loss of about 2.2 dB/km at the wavelength of 1520 nm. That is, the optical fiber of the fabrication C has the difference of 1 dB/km between the transmission loss values at the wavelengths of 1500 nm and 1520 nm, and thus the above isolation can be kept.

Furthermore, the optical fiber of the first embodiment has the cutoff wavelength of 800 nm or less and the transmission loss of 3 dB/km or less at the wavelength of 1390 nm, and thus it can excellently function as an optical fiber for Raman amplification.

Figure 2:
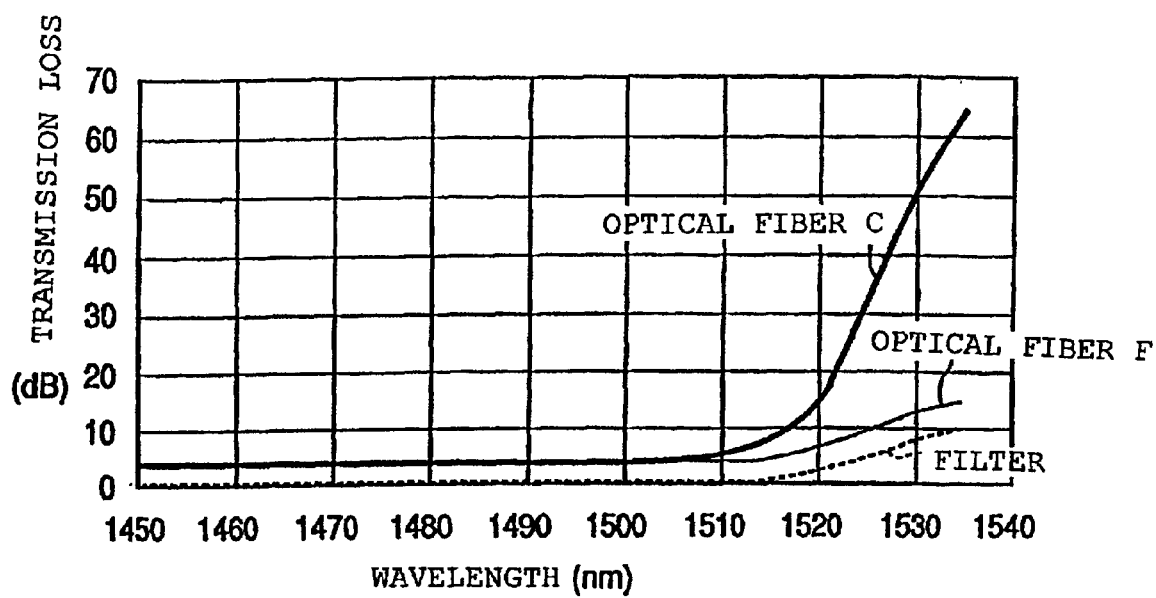
FIG. 2 is a graph showing the transmission loss characteristic of a fabrication according to the first embodiment together with the filter characteristic.

FIG. 2 shows the transmission loss characteristic when the optical fiber of the fabrication C (optical fiber C) of 5.4 km in length is used. FIG. 2 also shows the transmission loss characteristic when the optical fiber of the fabrication F (optical fiber F) of 5.3 km in length is used as a comparative example.

As shown in FIG. 2, the optical fiber of the fabrication C has a large transmission loss at the wavelength of 1520 nm, and it has larger transmission loss values at larger wavelengths. Accordingly, the optical fiber of the fabrication C can sufficiently exhibit the filtering function of cutting off the wavelengths in the C-band and the L-band.

On the other hand, the optical fiber of the fabrication F has a smaller transmission loss value at the wavelength of 1520 nm, and the isolation is insufficient.

Figure 3:
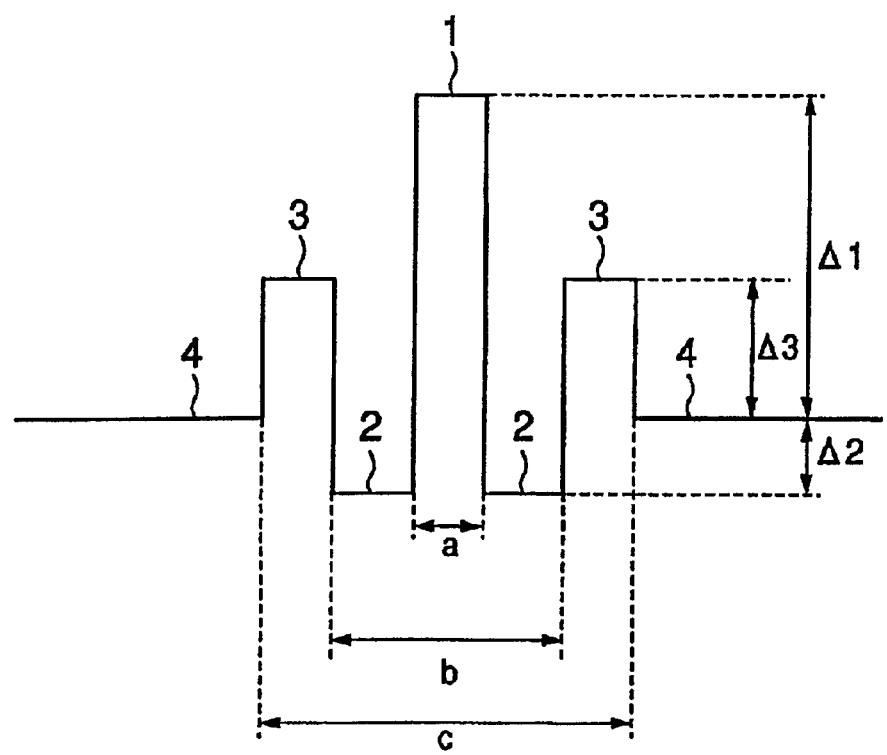
FIG. 3 is a diagram showing a refractive index profile according to a second embodiment of the optical fiber of the present invention.

FIG. 3 shows the refractive index profile of a second embodiment of the optical fiber according to the present invention. As shown in FIG. 3, the optical fiber of the second embodiment has multi-layered (four layers in this embodiment) glass layers (first glass layer 1, second glass layer 2, third glass layer 3, fourth glass layer 4) having different compositions between neighboring layers.

A standard layer serving as a standard for the refractive index distribution is the fourth glass layer 4. In the optical fiber of the second embodiment, at least three glass layers (first glass layer 1, second glass layer 2, third glass layer 3) are formed inside the fourth glass layer 4. In other words, the optical fiber of the second embodiment is designed such that the outer peripheral portion of the first glass layer 1 is covered by the second glass layer 2, the outer peripheral portion of the second glass layer 2 is covered by the third glass layer 3 and the outer peripheral portion of the third glass layer 3 is covered by the fourth glass layer 4.

As in the case of the first embodiment, the optical fiber of the second embodiment is designed under the condition that the relative refractive index differences Δ1 and Δ2 satisfy the following inequalities: $1.0\% \leq \Delta1 \leq 3.0\%$ and $-1.0\% \leq \Delta2 \leq -0.4\%$. The maximum relative refractive index difference Δ3 of the third glass layer 3 (third layer from the innermost of the optical fiber of the second embodiment) to the standard reference (fourth glass layer 4) satisfies the following inequality: $0 \leq \Delta3 \leq 0.5\%$.

The refractive index difference Δ3 is defined by the following equation (3). Here, $n_3$ represents the refractive index of the refractive-index maximum portion of the third glass layer 3.

$$\Delta3 = \{(n_3 - n_4)/n_3\} \times 100 \tag{3}$$

In the second embodiment, the diameter ration (c/b) of the second glass layer 2 and the third glass layer 3 is set to satisfy the following inequality: $1.0 < c/b < 2.7$. c represents the diameter of the third glass layer 3 formed in the third layer from the innermost of the optical fiber, and b represents the diameter of the second glass layer 2 formed in the second layer from the innermost of the optical fiber.

The inventor of this application have made optical fibers of various fabrications having the refractive index profile as shown in FIG. 3 to determine the construction of the optical fiber of the second embodiment.

The optical fibers of the above fabrications correspond to optical fibers O to U shown in the table 2. Of these fabricated optical fibers O to U, the optical fibers P, S and U correspond to the optical fiber of the second embodiment. The optical fibers of the fabrications O and R correspond to optical fibers having the three-layered structure like the first embodiment.

TABLE 2

| | Δ1 % | Δ2 % | Δ3 % | a μm | a/b | c/b | loss @ 1390 nm dB/km | loss @ 1500 nm dB/km | loss @ 1520 nm dB/km | CUTOFF WAVELENGTH nm | D @ 1500 nm ps/nm/km | S @ 1500 nm ps/nm2/km | D/S @ 1500 nm nm |
|---|---|---|---|---|---|---|---|---|---|---|---|---|---|
| O | 1.2 | −0.6 | 0.0 | 4.4 | 0.40 | 0.00 | 0.92 | 0.48 | 1.53 | <800 | −24.3 | −0.149 | 163 |
| P | 1.2 | −0.6 | 0.5 | 4.4 | 0.40 | 1.20 | 0.93 | 0.48 | 1.55 | 1357 | −63.9 | −0.548 | 117 |
| Q | 1.2 | −0.6 | 0.6 | 4.4 | 0.40 | 1.20 | 0.95 | 0.47 | 1.52 | 1484 | −83.2 | −0.657 | 127 |
| R | 3.0 | −1.0 | 0.0 | 1.7 | 0.40 | 0.00 | 2.65 | 0.79 | 2.22 | <800 | −105.6 | −0.435 | 243 |
| S | 3.0 | −1.0 | 0.1 | 1.7 | 0.40 | 2.70 | 2.66 | 0.77 | 1.81 | 1390 | −137.2 | −0.937 | 146 |
| T | 3.0 | −1.0 | 0.1 | 1.7 | 0.40 | 2.80 | 2.64 | 0.76 | 1.56 | 1463 | −138.8 | −0.964 | 144 |
| U | 2.4 | −0.6 | 0.2 | 1.7 | 0.32 | 1.70 | 2.51 | 0.52 | 1.94 | 1355 | −180.0 | −1.490 | 121 |

It is apparent from the table 2 that the same effect as the first embodiment can be achieved by an optical fiber even when the refractive index profile of the optical fiber has a four-layered structure and a third glass layer 3 having a positive relative refractive index is covered on the outer peripheral portion of the second glass layer 2.

The fabrications P, Q are designed such that the relative refractive index differences Δ1, Δ2, the diameter a of the first glass layer 1 and the ratio a/b of the diameter a of the first glass layer 1 and the diameter b of the second glass layer 2 are set to the same values as the fabrication O having the W-shaped refractive index profile of the two-layered structure. The cutoff wavelength of the fabrication O is equal to 800 nm or less. However, if the relative refractive index difference Δ3 is equal to 0.6% or more like the fabrication Q, the cutoff wavelength is shifted to the long wavelength side. Therefore, in the second embodiment, the relative refractive index difference Δ3 is set to 0.5% or less as described above.

The fabrications S, T are designed such that the relative refractive index differences Δ1, Δ2, the diameter a of the first glass layer 1 and the ratio a/b of the diameter a of the first glass layer 1 and the diameter b of the second glass layer are set to the same values as the fabrication R having the W-shaped refractive index profile of the two-layered structure. The cutoff wavelength of the fabrication R is equal to 800 nm or less. However, if the diameter ratio c/b of the third glass layer 3 and the second glass layer 2 is equal to 2.8 or more, the cutoff wavelength is shifted to the long wavelength side. Therefore, in the second embodiment, the diameter ratio c/b of the third glass layer 3 and the second glass layer 2 is set to 2.7 or less as described above.

The second embodiment is constructed as described above, and it has the same effect as the first embodiment.

Next, an embodiment of a dispersion compensator according to the present invention will be described.

The dispersion compensator according to the embodiment of the present invention is applied to the optical fiber of the fabrication C in the optical fibers of the above embodiments, and it is formed to have a length of 5.4 km. A single-mode optical fiber (for optical transmission) at a connection partner side has a dispersion value of +14 ps/nm/km and a dispersion slope of 0.063 ps/nm$^2$/km at the wavelength of 1500 nm. The length of the single-mode optical fiber is set to 40 km.

Table 3 shows the measurement results of the dispersion value of a transmission line (single-mode optical fiber) and the dispersion value of DCF (a dispersion compensator of an embodiment) in the range from 1420 nm to 1520 nm in wavelength. The table 3 also shows the measurement results of the dispersion value and the dispersion slope after the connection between the single-mode optical fiber and the dispersion compensator (after compensation).

TABLE 3

| WAVE-LENGTH nm | DISPERSION OF TRANSMISSION LINE ps/nm/km | DCF DISPERSION ps/nm/km | DISPERSION AFTER COMPENSATION ps/nm/km | DISPERSION SLOPE AFTER COMPENSATION ps/nm$^2$/km |
|---|---|---|---|---|
| 1420 | 8.8588 | −82.2865 | −2.29 | 0.048 |
| 1425 | 9.2235 | −83.2566 | −2.06 | 0.0456 |
| 1430 | 9.5847 | −84.2748 | −1.84 | 0.0436 |
| 1435 | 9.9424 | −85.3438 | −1.62 | 0.0415 |
| 1440 | 10.2968 | −86.4663 | −1.42 | 0.0394 |
| 1445 | 10.6479 | −87.6453 | −1.23 | 0.0371 |
| 1450 | 10.9958 | −88.8843 | −1.05 | 0.0348 |
| 1455 | 11.3405 | −90.1868 | −0.88 | 0.0324 |
| 1460 | 11.6820 | −91.5569 | −0.72 | 0.0299 |
| 1465 | 12.0204 | −92.999 | −0.58 | 0.0273 |
| 1470 | 12.3559 | −94.5178 | −0.45 | 0.0245 |
| 1475 | 12.6883 | −96.1187 | −0.34 | 0.0216 |
| 1480 | 13.0178 | −97.8075 | −0.24 | 0.0186 |
| 1485 | 13.3444 | −99.5907 | −0.15 | 0.0153 |
| 1490 | 13.6682 | −101.475 | −0.08 | 0.0119 |
| 1495 | 13.9893 | −103.47 | −0.03 | 0.0083 |
| 1500 | 14.3075 | −105.582 | 0.00 | 0.0044 |
| 1505 | 14.6231 | −107.823 | 0.01 | 0.0002 |
| 1510 | 14.9361 | −110.204 | 0.00 | −0.0042 |
| 1515 | 15.2464 | −112.736 | −0.03 | −0.0091 |
| 1520 | 15.5542 | −115.435 | −0.09 | −0.015 |

In the table 3, the dispersion slope after the compensation is achieved by dividing the difference between the dispersion value of +5 nm in wavelength and the dispersion value of −5 nm in wavelength by 10. For example, the dispersion slope at the wavelength of 1550 nm is equal to [(dispersion value at 1555 nm)−(dispersion value at 1545 nm)]/(15555−1545).

As is apparent from the table 3, the dispersion compensator of an embodiment is effective as a dispersion compensator for S-band. That is, the dispersion compensator of the embodiment is applicable for the dispersion compensation for the single-mode optical fiber within the wavelength range from 1420 nm to 1520 nm. By applying this dispersion compensator, the dispersion compensator concerned can set the average dispersion to a value ranging from −0.02 ps/nm$^2$/km to 0.03 ps/nm$^2$/km in a wavelength band of 40 nm or more within the wavelength range from 1460 nm to 1520 nm.

Further, by applying the dispersion compensator of the embodiment, the dispersion compensator concerned can set the dispersion slope in a wavelength band of 20 nm or more within the wavelength range from 1495 nm to 1515 nm to a value ranging from −0.01 ps/nm$^2$/km to +0.01 ps/nm$^2$/km.

Still further, the dispersion compensator of the embodiment is formed by using the optical fiber of the fabrication C, so that it can sufficiently exhibit the filtering function of cutting off the wavelengths in the C-band and the L-band.

That is, the dispersion compensator of the embodiment can realize the high-quality wavelength division multiplexing transmission when it is applied to an optical transmission system.

Figure 4:
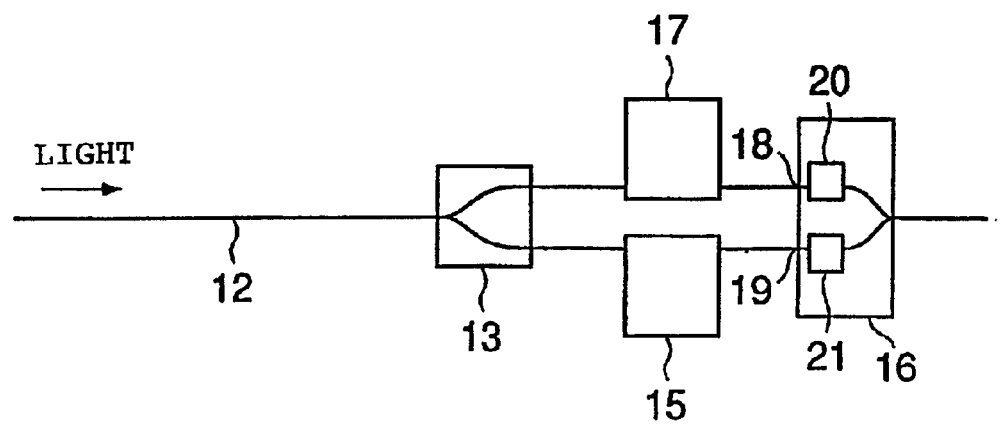
FIG. 4 is a diagram showing an optical communication system to which an embodiment of a dispersion compensator of the present invention is applied.

FIG. 4 shows an embodiment of an optical transmission system to which the dispersion compensator of the embodiment (the dispersion compensator for S-band) is applied.

In FIG. 4, an optical demultiplexer 13 is provided at the light emission side of an optical transmission line 12 for the wavelength division multiplexing transmission. One light branched from the optical demultiplexer 13 is passed through a dispersion compensator 17 for C-band and L-band and incident to the incident port 18 of an optical multiplexer 16 having a filter. The other light branched from the optical demultiplexer 13 is passed through a dispersion compensator 15 of the embodiment for S-band and incident to the incident port 19 of an optical multiplexer 16 having a filter.

A high pass filter 20 for cutting light in the S-band and transmitting light in the C-band and the L-band therethrough is provided at the incident port 18 side of the optical multiplexer 16 having the filter. Further, a low pass filter 21 for cutting light in the C-band and the L-band and transmitting light in the S-band therethrough is provided at the incident portion 19 side of the optical multiplexer 16 having the filter.

In the system shown in FIG. 4, the characteristic of the low pass filter 21 is shown by a characteristic line of FIG. 2. When this filter is applied, the following problem would occur if the light cutting function (transmission loss) at the wavelength of 1520 nm is small. That is, in this case, when the light in the C-band and the L-band is incident to the incident port 19 side of the optical multiplexer 16 having the filter, the light is multiplexed by the optical multiplexer 16 having the filter and emitted.

Here, the light in the C-band and the L-band which is incident from the incident port 19 side of the optical multiplexer 16 having the filter is not compensated in chromatic dispersion. Therefore, when the light is emitted from the optical multiplexer 16 having the filter, signal light distortion occurs due to chromatic dispersion.

However, the optical fiber of the fabrication C forming the dispersion compensator 15 for S-band according to the embodiment has a large transmission loss at the wavelength of 1520 nm or more as shown by the characteristic line of FIG. 2, and thus it can cut off the light having the wavelength of 1520 nm or more. Accordingly, the application of this dispersion compensator 15 can prevent the light in the C-band and the L-band from being incident to the incident port 19 side of the optical multiplexer 16 having the filter. That is, the signal light distortion due to the chromatic wavelength of the C-band and the L-band can be suppressed.

Figure 5:
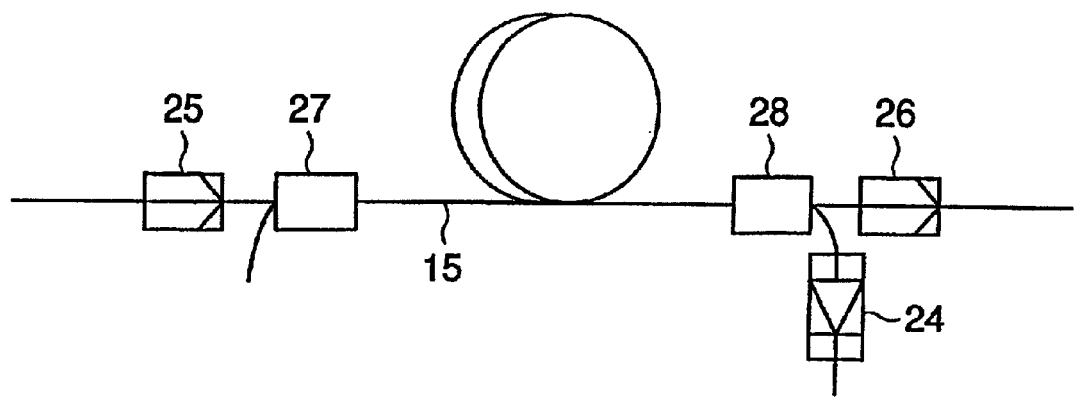
FIG. 5 is a diagram showing the construction of a light source for a Raman fiber amplifier.

FIG. 5 shows an embodiment of a dispersion compensating Raman fiber amplifier constructed by applying the dispersion compensator 15 described above.

The dispersion compensating Raman fiber amplifier is formed by connecting the dispersion compensator 15 to a pumping source 24 for Raman fiber amplification which pumps in the neighborhood of the wavelength of 1390 nm. In FIG. 5, reference numeral 25, 26 represents an optical isolator, and reference numeral 27, 28 represents a coupler. The optical fiber of the fabrication C in the table 1 is applied as the optical fiber which forms the dispersion compensator 15, and the length thereof is set to about 5.4 km.

The transmission loss at the wavelength of 1500 nm of the dispersion compensating Raman fiber amplifier thus constructed is the transmission loss of the optical fiber of the fabrication C having the length of about 5.4 km, and this value is equal to about 4.3 dB. The transmission loss at the wavelength of 1500 nm of the single-mode optical fiber of 40 km in length is equal to about 10 dB. Accordingly, if the transmission loss which is totally equal to about 14.3 dB can be compensated by the gain of the Raman fiber amplifier, the transmission loss of the optical transmission line and the transmission loss of the dispersion compensator can be compensated.

Figure 6:
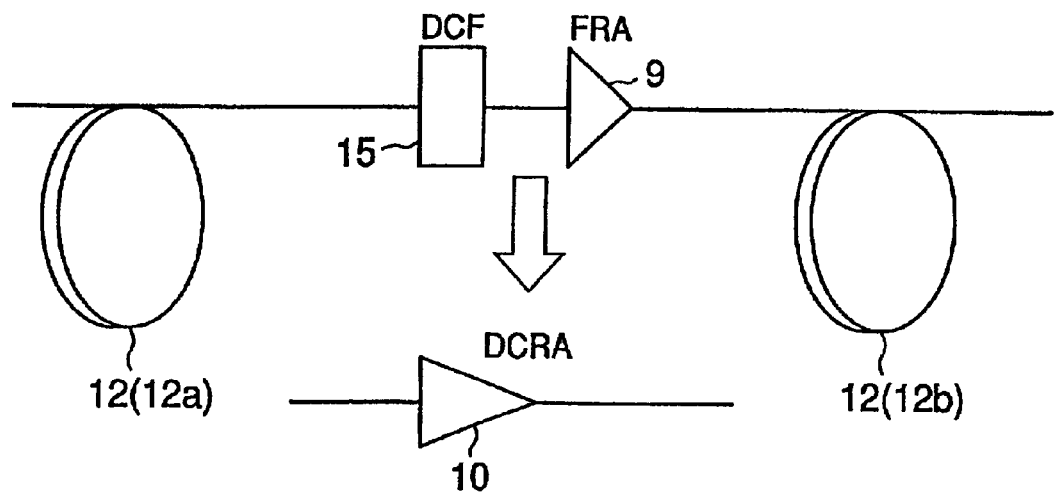
FIG. 6 is a diagram showing a system using a dispersion Raman fiber amplifier.

FIG. 6 shows an optical transmission system using the above dispersion compensating Raman fiber amplifier.

The dispersion compensating Raman fiber amplifier 10 is constructed by the dispersion compensator 15 and the Raman fiber amplifier 9, and the dispersion compensating Raman fiber amplifier 10 is interposed between optical transmission lines 12 (12a, 12b).

Here, the Raman gain $10 \cdot \log_{10} \{Is(L)/Is(0) \cdot \exp(-\alpha s \cdot L)\}$ is represented by the following equation:

$$10 \cdot \log_{10}\{Is(L)/Is(0) \cdot \exp(-\alpha s \cdot L)\} = \exp(er \cdot Io \cdot Leff) \quad (4)$$

Here, $Leff=1/\mu p[1-10 \cdot \log_{10} \cdot \exp(-\mu p) \cdot L]$. $\mu p$ represents the loss at the pumping light wavelength (pumping wavelength), and $\alpha s$ represents the loss at the signal light wavelength. L represents the length of the optical fiber, and it is set to 5.4 km. Is(L) represents signal light power at the output end, Is (0) represents signal light power, gr represents a Raman gain coefficient, and Io represents power input to the pumping source.

The Raman gain coefficient gr of each of the single-mode optical fiber and the optical fiber of the fabrication is equal to about 4.4 (1/W/km). The optical fiber of the fabrication C having a transmission loss of 2.65 dB/km at the wavelength of 1390 nm may be used as the optical fiber for the dispersion compensator, and the power Io input to the pumping source may be set to about 470 mW.

When the optical fiber of the fabrication D of the table 1 is used as the dispersion compensating Raman fiber amplifier, the transmission loss of the optical fiber at the wavelength of 1390 nm is equal to 3.20 dB/km. Accordingly, it is needed to input light having power exceeding 500 mW (about 560 mW) to the pumping source. When a laser diode used at present is applied as a pumping source, it is difficult to input light having power exceeding 500 mW even when polarization multiplexing is used, and thus a sufficient gain cannot be achieved as the Raman fiber amplifier.

As described above, when the dispersion compensating Raman fiber amplifier is constructed by using the dispersion compensator of the above embodiment, it is important to reduce the transmission loss at the wavelength of 1390 nm to 3 dB/km or less.

The present invention is not limited to the above-described embodiments, and various modifications may be made. For example, the present invention is applicable to not only the dispersion compensation of the single-mode optical fiber in the S-band, but also various fields as an optical fiber for performing the wavelength division multiplexing transmission in the S-band. For example, the optical fiber of the fabrication M shown in the table 1 may be applied for the dispersion compensation of an optical fiber having a dispersion value of about −0.5 ps/nm/km to about 5 ps/nm/km in the S-band.

Further, in the optical fibers of the above-described embodiments, the transmission loss at the wavelength of 1390 nm is equal to 3 dB/km or less. The wavelength division multiplexing transmission in the S-band can be carried out by using an optical amplifier other than the Raman fiber amplifier. The wavelength division multiplexing transmission in the S-band may be performed by TDFA (thulium-doped fiber amplifier), for example. In this case, the transmission loss at the wavelength of 1390 nm of the optical fiber may be set to a value exceeding 3 dB/km.

Furthermore, in the optical fiber of the present invention, the chromatic dispersion at a set wavelength within the wavelength range from not less than 1420 nm to less than 1520 nm may be set to −8 ps/nm/km or less. That is, the values of the transmission loss, the cutoff wavelength, etc. of the optical fiber according to the present invention are not limited to those of the above-described embodiments. By determining the chromatic dispersion as described above, the chromatic dispersion in the S-band of the optical transmission line of the single-mode optical fiber or the like can be efficiently compensated.

What is claimed is:

1. An optical fiber, characterized in that the chromatic dispersion of said optical fiber at a set wavelength within the wavelength range 1420 nm or more but less than 1520 nm is set to −8 ps/nm/km or less and a transmission loss at a wavelength of 1 390 nm is set to 3 dB/km or less.

2. The optical fiber as claimed in claim 1, wherein the transmission loss at the wavelength of 1520 nm is set to be larger than the transmission loss at the wavelength of 1500 nm.

3. The optical fiber as claimed in claim 1, wherein the cutoff wavelength of said optical fiber is set to be shorter than 1360 nm.

4. The optical fiber as claimed in claim 2, wherein the transmission loss at the wavelength of 1520 nm is set to be larger than the transmission loss at the wavelength of 1500 nm by 1 dB or more.

5. The optical fiber as claimed in claim 1, wherein the chromatic dispersion and the dispersion slope in a set wavelength band of 20 nm or more which is set within the wavelength of 1420 nm or more but less than 1 520 nm are set to negative values, and the value achieved by dividing the chromatic dispersion by the dispersion slope at any wavelength in the set wavelength band is set to a positive value less than 300 nm.

6. The optical fiber as claimed in claim 1, comprising:
   multi-layered glass layers having different compositions between neighboring layers; and
   at least two glass layers formed inside a standard layer serving as a standard for a refractive index distribution in said glass layers, wherein when the maximum relative refractive index difference of a first glass layer formed at the innermost of said optical fiber to the standard layer is represented by $\Delta 1$, the following inequality is satisfied: $1.0\% \leq \Delta \leq 3.0\%$, and when the minimum relative refractive index difference of a second glass layer as a second layer from the innermost of said optical fiber to the standard layer is represented by $\Delta 2$, the following inequality is satisfied: $-1.0\% \leq \Delta \leq -0.4\%$.

7. The optical fiber as claimed in claim 1, comprising:
   multi-layered glass layers having different compositions between neighboring layers; and at least three glass layers formed inside a standard layer serving as a standard for a refractive index distribution in said glass layers, wherein when the maximum relative refractive index difference of a first glass layer formed at the innermost of said optical fiber to the standard layer is represented by $\Delta 1$, the following inequality is satisfied: $1.0\% \leq \Delta \leq 3.0\%$, when the minimum relative refractive index difference of a second glass layer as a second layer from the innermost of said optical fiber to the standard layer is represented by $\Delta 2$, the following inequality is satisfied: $-1.0\% \leq \Delta \leq -0.4\%$ and when the maximum relative refractive index difference of a third glass layer as a third layer from the innermost of said optical fiber to the standard layer is represented by $\Delta 3$, the following inequality is satisfied: $0 \leq \Delta \leq 0.5\%$.

8. The optical fiber as claimed in claim 1, comprising:
   multi-layered glass layers having different compositions between neighboring layers; and
   at least two glass layers formed inside a standard layer serving as a standard for a refractive index distribution in said glass layers, wherein the diameter of the first glass layer formed at the innermost of said optical fiber is set to a value ranging from 1.7 $\mu$m to 5.0 $\mu$m, and the value (a/b) achieved by dividing the diameter a of the first glass layer by the diameter b of the second glass layer formed as a second layer from the innermost of said optical fiber is set to satisfy the following inequality: $0.3 \leq a/b \leq 0.6$.

9. The optical fiber as claimed in claim 1, comprising:
   multi-layered glass layers having different compositions between neighboring layers; and
   at least three glass layers formed inside a standard layer serving as a standard for a refractive index distribution in said glass layers, wherein the value (c/b) achieved by dividing the diameter c of a third glass layer as a third layer from the innermost of said optical fiber by the diameter b of a second glass layer as a second layer from the innermost of said optical fiber is set to satisfy the following inequality: $1.0 \leq c/b \leq 2.7$.

10. A dispersion compensator, comprising: said optical fiber as claimed in claim 1, wherein said dispersion compensator is connected to an optical transmission line so that the dispersion slope in a wavelength band of 20 nm or more which is set within the wavelength range of 1420 nm or more but less than 1520 nm is compensated to a value ranging from not less than −0.02 ps/nm$^2$/km to not more than 0.03 ps/nm$^2$/km.

11. A dispersion compensator, comprising: said optical fiber as claimed in claim 10, wherein said dispersion compensator is connected to an optical transmission line so that the dispersion slope in a wavelength band of 20 nm or more which is set within the wavelength range of 1420 nm or more but not more than 1520 nm is compensated to a value ranging from −0.01 ps/nm$^2$/km 0.01 ps/nm$^2$/km.

12. An optical transmission system having said dispersion compensator as claimed in claim 10.

13. The optical transmission system as claimed in claim wherein a pumping source for Raman amplification is connected to an optical fiber for dispersion compensation.

14. The optical transmission system as claimed in claim 12, wherein said optical transmission system is used while connected to a system for performing optical transmission of at least one of a C-band and an L-band.

* * * * *